H. CENTERVALL.
INTERNAL COMBUSTION ENGINE.
APPLICATION FILED MAY 22, 1916.

1,386,766. Patented Aug. 9, 1921.

Inventor
Hugo Centervall
By his Attorney
W. B. Morton

UNITED STATES PATENT OFFICE.

HUGO CENTERVALL, OF BROOKLYN, NEW YORK.

INTERNAL-COMBUSTION ENGINE.

1,386,766. Specification of Letters Patent. Patented Aug. 9, 1921.

Application filed May 22, 1916. Serial No. 99,066.

*To all whom it may concern:*

Be it known that I, HUGO CENTERVALL, a native of Sweden, and a resident of Brooklyn, county of Kings, and State of New York, have invented new and useful Improvements in Internal-Combustion Engines, of which the following is a specification.

This invention relates to internal combustion engines and particularly to a piston and cylinder construction therefor whereby an engine of much lighter weight per horse power is provided than has been heretofore possible.

In the construction of internal combustion engines for light vehicles and particularly for aeroplanes, the metal aluminum has been used with considerable success, particularly for crank cases, water jackets and similar parts. It has been proposed also to use aluminum for the cylinder of the engine, but such use has not met with pronounced success for several reasons.

This metal, while of ample tensile strength and heat resisting qualities, is soft, and it has been found that a piston provided with the ordinary packing rings cannot be used because the rings cut into the walls of the cylinder and soon render it useless. Furthermore, if the piston is used without packing rings it cannot be made tight enough to hold the compression because of the difference in the coefficients of the expansion of aluminum and iron or steel or other metal suitable for working engagement with the aluminum.

By my improved construction I provide an engine in which the cylinder may be composed entirely of aluminum and the piston may also be composed substantially of aluminum so that the weight of the engine is reduced to but a fraction of former successfully operative structures.

The invention also has for its object to provide a piston construction in which the contacting surfaces are of metals which make a good working couple and in which the clearance between the piston and cylinder is not altered by changes in temperature.

A further object of the invention is to provide an engine construction in which any wear between the piston and cylinder is taken up by a compressible packing having the same effect as a piston ring and in which there are no edges to damage the walls of the cylinder, the packing extending around the entire circumference of the piston without a break as is customary in piston ring construction.

In the accompanying drawings I have illustrated two slightly different forms of my invention, either of which will be found to give very satisfactory results. In the said drawings, Figures 1 and 2 are vertical sectional views at right angles to each other through a piston embodying one form of my invention;

Figure 1:
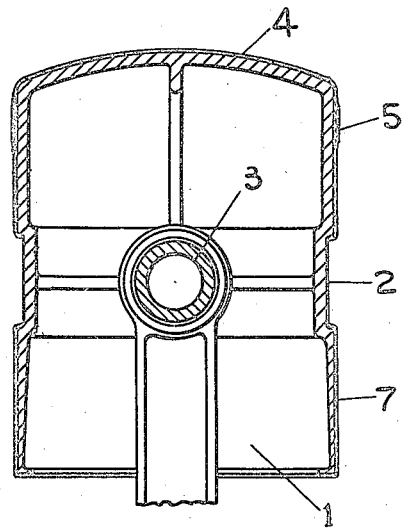
Figure 2:
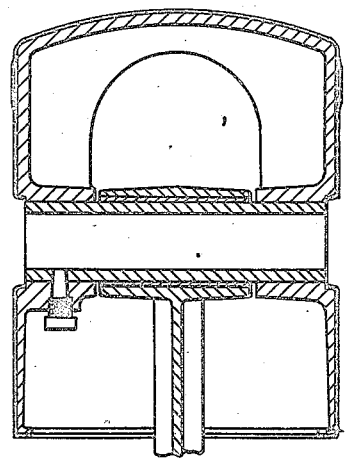
Figures 5, 6:
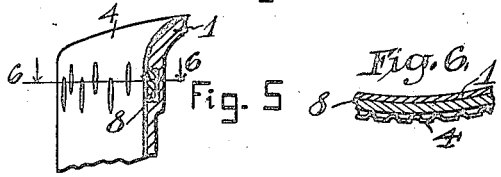
Fig. 5 is a detail view showing a construction which will be described later.
Fig. 6 is a sectional view taken on plane 6—6 of Fig. 5.

Referring to the drawings, particularly to Figs. 1 and 2, 1 indicates the body of the piston which may be cast and is preferably formed of aluminum in the design shown. The outer surface of the aluminum portion of the piston is cylindrical and without grooves except the middle groove 2 at the point of attachment of the cross pin 3. The outer face of the aluminum body of the cylinder is covered throughout the upper portion by a cap 4 of thin sheet metal which may be either steel or copper or other metal suitable for working engagement with aluminum. The cap may be advantageously formed by spinning the metal and may be less than one sixty-fourth of an inch in thickness. Spun in the metal in the cylindrical surface of the cap just below the end face is an enlargement or bead 5 which forms an effective packing ring for holding the compression of the expansible fluid, the bead having a flat face of sufficient width to hold the compression, with rounded edges blending into the metal of the cap without corners of any kind to form a cutting or wearing edge against the metal of the cylinder. The metal of the cap is sufficiently thin to stretch under the expansion of the aluminum body of the cylinder so that when the piston is used in an aluminum cylinder such for example as shown at 6 in Fig. 3, the expansion of the piston and the cylinder will be the same, consequently there will be no difference in clearance at different temperatures. The elasticity of the metal of the cap will be sufficient for the bead 5 to maintain a tight joint and take up the slight increase in diameter of the cylinder occasioned by unavoidable wear. If, however, it is desired, the bead 5 may be provided with staggered corrugations as indicated in Fig. 5 so that the bead may be compressed when the piston is inserted in the cylinder, and may expand after the manner of an ordinary piston ring.

The lower part of the body of the piston below the central groove is also covered with a smooth sheet metal sleeve 7 of the same character as employed by the cap 4. The lower edge of the cap 4 and the upper edge of the sleeve 7 are rounded over the edges of the groove 2 so as to avoid cutting edges to score the cylinder, and the lower edge of the sleeve 7 is turned under the edge of the piston body 1 in the same manner.

If desired the cap 4 may be also in the form of a sleeve with its edge turned over the upper edge of the piston instead of covering the entire transverse face of the piston. The essential thing is to interpose between the two aluminum parts a thin metal covering to provide a working engagement with the aluminum cylinder, it being well known that an aluminum part cannot have a working engagement with another part of aluminum without producing a great deal of friction and destructive wear. By employing the thin sleeve of steel or copper, a suitable working engagement is provided and at the same time the piston as a whole has the same coefficient of expansion as the cylinder and will consequently hold the compression at all temperatures. Enlargement of the sleeve or cap effected by the expansion of the aluminum body of the piston is not sufficient to strain the sleeve or cap beyond its elastic limit, consequently the sleeve will contract with the piston and will not become loose on the piston when the engine cools down after use.

Figure 3:
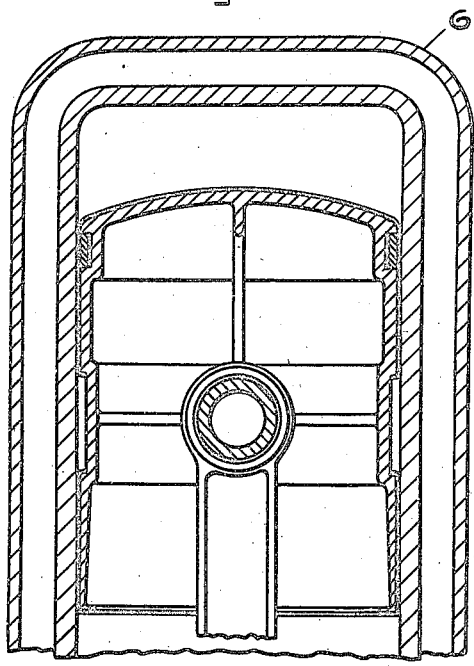
Fig. 3 is a vertical sectional view of a modified form of piston, the piston being shown in its working position in an engine cylinder.
Figure 4:
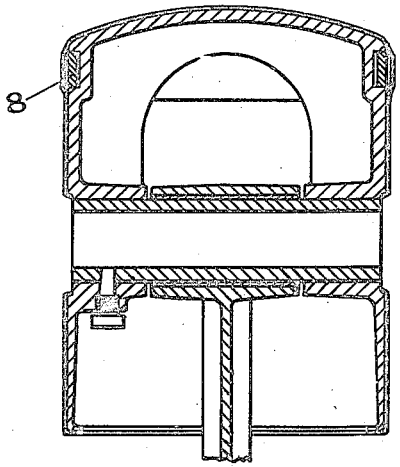
Fig. 4 is a vertical sectional view showing a slightly different construction.

In the construction shown in Figs. 3 and 4 the bead 5 is not employed, but instead there is set in the aluminum body of the piston a piston ring 8 of usual construction which is contracted into its groove when the cap 4 is assembled on the body of the piston so that it will exert an expanding pressure against the inner surface of the cap. If desired the beaded cap may be used in conjunction with the ring construction of Figs. 3 and 4, the ring working in the recess formed in the inner face of the cap by the bead. The ring will be particularly useful in conjunction with the cap having the staggered vertical corrugations shown in Fig. 5, the especial purpose of the ring being to add to the inherent elasticity of the metal of the cap to expand the cap when taking up the clearance occasioned by unavoidable wear.

While I have described my improved piston and cylinder as composed of aluminum, it will of course be understood that other metals may be used or alloys of such metals with aluminum as may be desirable for different purposes.

It will also be understood that instead of forming the outer sleeve in two parts with an intermediate groove at the cross pin, the entire cylindrical wall of the piston will be covered with a single sleeve. The groove, is however of advantage, as it furnishes an oil-carrying channel and also gives ready access to the cross pin in case repairs are necessary.

I claim:

1. An internal combustion engine having a cylinder and its piston composed chiefly of the same metal, one of said members supporting an intervening bearing sleeve of a different metal, said sleeve being connected to said part so as to respond to the expansion and contraction of said part, regardless of its coefficient of heat expansion.

2. A piston for an internal combustion engine consisting of a body portion of light metal and a wearing sleeve surrounding the working face of the body of the piston, said sleeve being unbroken and formed of thin sheet metal of a lower coefficient of heat expansion than the light metal forming the body of the piston, and yielding to the expansion and contraction of said piston regardless of its own co-efficient of expansion.

3. A piston for internal combustion engines consisting of a body portion and an unbroken sleeve surrounding the body portion and having a bead formed in its wall, said sleeve yielding to the expansion and contraction of said body portion regardless of its own co-efficient of expansion, and said bead being provided with a flat face designed to hold compression of the engine and with rounded edges blending into the sleeve whereby the bead is prevented from having any cutting effect.

4. A piston for internal combustion engines consisting of a body portion and an unbroken sleeve portion surrounding the body portion and extending part way of the length thereof, said sleeve portion being expanded slightly away from the body portion to hold the compression of the engine, and yielding to the expansion and contraction of said body portion regardless of its own co-efficient of expansion.

5. A piston for internal combustion engines consisting of a body portion and an unbroken sleeve completely surrounding the body portion and extending part way of the length thereof, said sleeve portion being expanded slightly away from the body portion to hold the compression of the engine, and means disposed between the body portion and the sleeve portion for expanding the latter.

6. In an internal combustion engine a cylinder of soft metal, a piston therefor having a body of soft metal, a wearing sleeve surrounding the side walls of the piston, said sleeve having an integral portion extending part way of its length and around the piston and expanded slightly away from the body of the piston to hold the compression of the cylinder without presenting a cutting edge to score the soft metal of the cylinder.

7. In an internal combustion engine a cylinder of aluminum, a piston therefor having a body of aluminum, a wearing sleeve surrounding the side walls of the piston, said sleeve having an integral portion extending part way of its length and around the piston and expanded slightly away from the body of the piston to hold the compression of the cylinder without presenting a cutting edge to score the aluminum of the cylinder.

8. In an internal combustion engine a cylinder of soft metal, a piston therefor having a body of soft metal, a wearing sleeve surrounding the side walls of the piston, said sleeve having an integral portion extending part way of its length and around the piston expanded slightly away from the body of the piston to hold the compression of the cylinder without presenting a cutting edge to score the soft metal of the cylinder, the metal of said sleeve being thin enough to stretch under the expansion of the body of the piston as affected by the heat of combustion.

Signed at New York city, in the county of New York and State of New York, this 15 day of May, 1916.

HUGO CENTERVALL.